Nov. 22, 1949  G. T. WILLSON  2,488,754
MILKING MACHINE TIME DETERMINER
Filed Oct. 31, 1945  2 Sheets-Sheet 1

WITNESS:

INVENTOR
George T. Willson
BY
Busser and Harding
ATTORNEYS.

Patented Nov. 22, 1949

2,488,754

UNITED STATES PATENT OFFICE 2,488,754

MILKING MACHINE TIME DETERMINER

George T. Willson, Poughkeepsie, N. Y., assignor to The De Laval Separator Company, New York, N. Y., a corporation of New Jersey Application October 31, 1945, Serial No. 625,735

8 Claims. (Cl. 177—311)

This invention relates to a device for uniformly timing the period of milking of a cow at each successive milking. It is intended for application to known commercial milking machines without necessarily modifying their construction. Carefully supervised tests and veterinarian records relating thereto show that cows should, within limits, be milked in as short a time as possible, and that, if the milking period is extended beyond this necessary time, the udders may suffer more or less harm.

One of the objects of the invention is to provide a device which will be readily adaptable to present automatic milking machines and which, in conjunction with that equipment, will give a signal to the milking attendant when the cow has been milked for a definite predetermined length of time.

It is another object of the invention to provide a device which, after the device has been set to determine its time cycle, will be fully automatic as to its starting, stopping and resetting without any act in addition to the usual milking operations on the part of the milking attendant.

It is another object of the invention to provide a device which will be small, compact and of such a size as to be mounted on the stall cock at the head of each cow stall.

It is still another object of the invention to provide a device which will be simple in construction, compact and easy to manufacture for the purposes set forth and hereinafter more fully described.

Figure 1:
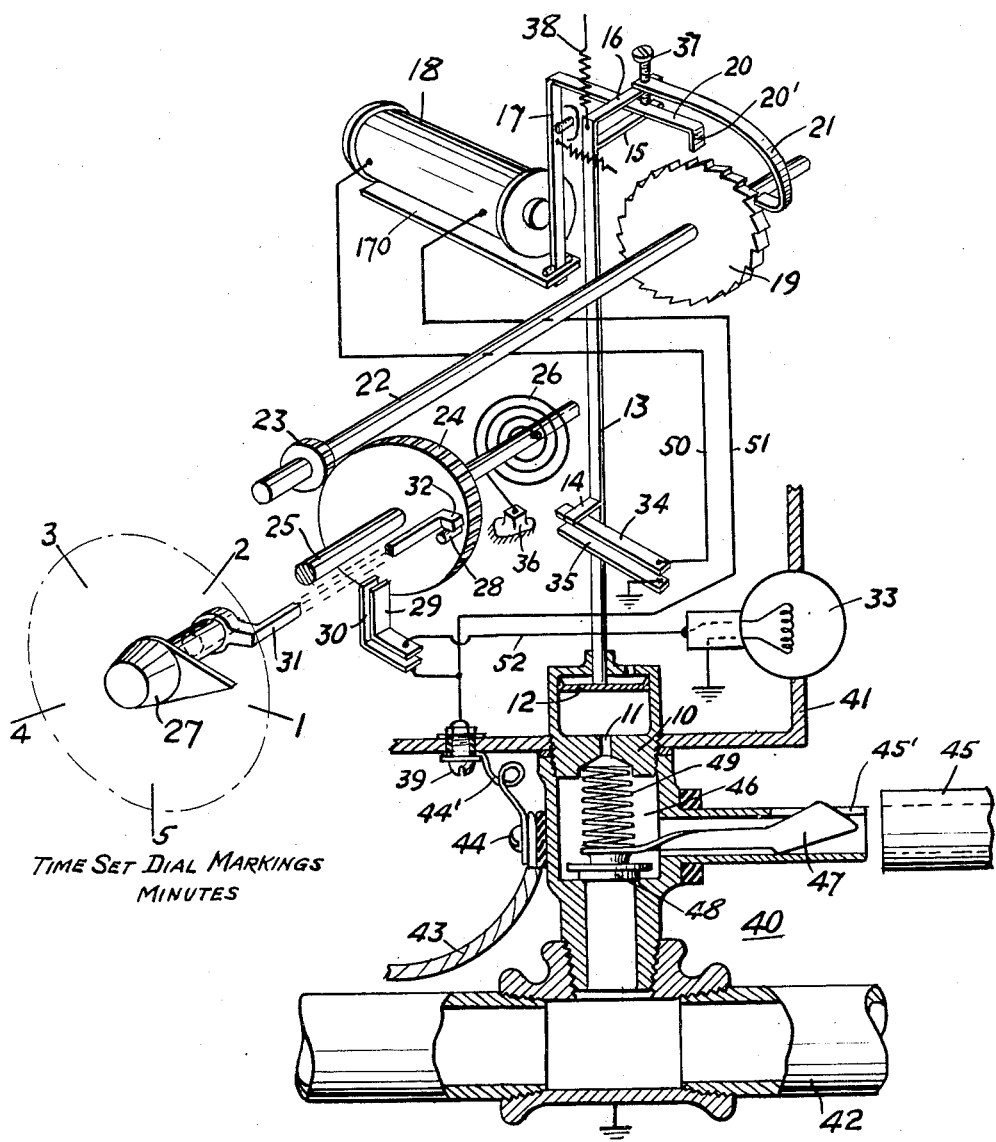
Fig. 1 is a schematic layout of a milking timer embodying the invention, applied to the stall cock of a regular milking machine installation.

This embodiment of the invention is particularly adapted to be used in conjunction with a magnetic type milking machine installation wherein a usual pipe line 42 containing air at sub-atmospheric pressure is arranged along the line of cow stanchions in the barn and provided, adjacent the stall of each cow, with a stall cock, generally indicated at 40, which may be of the type, for instance, disclosed in U. S. Patent No. 2,251,071, issued July 29, 1941. A pulsating current carrier, wire 43, is also arranged in conjunction with the pipe line and connects with a terminal 44, at each stall cock. The apparatus embodying the main elements of the invention, and the operation of which is controlled jointly by the specified pulsating current and partial vacuum, is mounted directly on the stall cock 40 by threading the screw plug 10, on which the casing 41 is mounted into the top of the valve or stall cock 40, in the same manner in which the cap shown in U. S. Patent No. 2,251,071 is applied, and connecting a jumper wire 44' between terminal 39 and 44.

The casing 41, which encloses most of the apparatus, but which is broken away in order to enable the details of the apparatus to be clearly shown, has mounted therein a screw plug 10, which is secured to the regular stall cock, generally indicated at 40. The screw plug 10 has a restricted central bore 11 therethrough. One end of the bore 11 opens into the vacuum chamber 46 of the stall cock, and the other end opens into a small chamber closed by a diaphragm 12. Affixed to this diaphragm is a rod-like extension 13, having near its lower end a projection 14 and at its upper end two projections 15 and 16. Projection 14 is so arranged that any downward motion of rod 13 will cause it to strike against a flexible contact 34 and flex it to make an electrical connection with a stationary contact 35 and thus complete an electrical circuit from ground through contacts 35 and 34 and thence, through wire 50, relay 18, wire 51, terminal 39, jumper wire 44', terminal 44 and wire 43 to the source of pulsating electrical energy. Rod 13 is urged in an upward direction by means of a spring 38.

An armature 17 of relay 18, pivotally mounted on a support 170, has an arm 20 slidably supported between the projection 15 and a set screw 37. The amount of vertical clearance between these elements is determined by the adjustment of set screw 37. The arm 20, having at its end a finger 20', functions as a pawl to drive the ratchet wheel 19 as hereinafter described. Arm 20 of armature 17 slides freely between adjusting screw 37 and projection 15. Screw 37 is the means by which pawl 20' is engaged with the ratchet wheel 19 when rod 13 is lowered, while projection 15 disengages pawl 20' from the ratchet wheel when rod 13 is raised. Carried by the projection 16 is a holding pawl 21 engageable with the ratchet wheel 20. When the device is not in operation, the rod is in its extreme upper position, as shown in the drawing, under the influence of spring 38, and the pawls are held up out of driving relation with the ratchet wheel. When rod 13 is in its extreme lower position under the influence of diaphragm 12, that is, when the device is in operation, set screw 37 and projection 16 lower the driving pawl 20 and holding pawl 21 into operating contact with the ratchet wheel 19.

Ratchet wheel 19 is mounted rigidly on a shaft 22. Pinion gear 23 is also rigidly mounted on shaft 22. Pinion 23 is in constant mesh with a gear wheel 24 rigidly mounted on a shaft 25. A spiral spring 26 is affixed at one end to shaft 25 and at the other end to a lug 36 secured in fixed position relative to the casing 41. This spring tends to turn the gear wheel 24 in an anticlockwise direction but is held from turning beyond a certain distance by engagement of an insulated projection 28 on one side of the gear wheel 24 with a projection 32 on a hereinafter described stop arm 31. When, as hereinafter described, gear wheel 24 is turned in a clockwise direction against the tension of spring 26, it will strike against a flexible contact arm 29 and move its free end into engagement with a fixed contact 30, thereby, through a shunt circuit 52, establishing an electrical connection with a warning signal device, such as lamp 33, mounted in the containing case 41.

A time indicating knob 27, on the outside of the casing, is turnably mounted on an axis coincident with the center line of shaft 25. As shown, it is mounted on a bushing on the shaft 25, which bushing is extended inside the casing and there carries the hereinbefore mentioned stop arm 31. The position of the arm 31, against the projection 32 on which, at the start of operation, the projection 28 abuts, as hereinbefore described, determines the arcuate distance that the gear wheel 24 will turn before it strikes the flexible contact arm 29 and therefore governs, as will be hereinafter explained, the time of milking.

Modern milking machine pulsations are in the order of 48 per minute and that frequency is present in the electrical connection to the stall-cock; that is, the electrical energy is on and off that number of times per minute at terminal 39, when the device comprising my invention is installed on the stall-cock.

When the hose 45 of a milker unit is connected to the pipe 45' of the stall-cock, it actuates a spring arm 47 to lift the valve 48 against the pressure of spring 49, and sub-atmospheric pressure is automatically applied to the chamber 46. As a result of this applied sub-atmospheric pressure acting through orifice 11, diaphragm 12 and rod 13 will be pulled down, closing contacts 34 and 35 and at the same time lowering driving pawl 20 and holding pawl 21 into operative engagement with ratchet wheel 19. Closure of contacts 34 and 35 completes the operating circuit for relay 18 from the pulsating electrical energy terminal 39 and relay 18 will be energized and deenergized 48 times per minute as long as contacts 34 and 35 remain closed. Ratchet wheel 19 is provided with 48 teeth and will therefore be turned at the rate of one revolution per minute in a counter-clockwise direction. Pinion gear 23 is provided with 12 teeth and gear wheel 24 is provided with 60 teeth. Gear wheel 24 will therefore turn at the rate of one revolution every five minutes in a clockwise direction.

In the drawing, the device is shown as being set for a little more than one minute running time by knob 27, the insulated projection 28 on gear wheel 24 being held, at the start of operation, against projection 32 on arm 31, under the influence of spring 26. Operation of relay 18 causes the gear wheel 24 to rotate clockwise and insulated projection 28 will be carried in a clockwise direction until it comes in contact with flexible contact arm 29, causing the latter to make connection with the rigid contact 30, thus completing the electrical circuit for the signal device, such as lamp 33. The lamp, being activated by pulsating electrical energy from terminal 39, will then flash on and off, thereby indicating to the milking attendant that the predetermined time cycle has elapsed. Rigid contact 30 is of sufficient stiffness to prevent further movement of the gear wheel 24 as a result of continued pulsation of relay 18. In other words, the armature 17 is not able to overcome the resistance of contact 30, and therefore remains unable to respond to the influence of the coil of relay 18. The milking attendant, upon noticing the lamp flashing, should then remove the milking machine from both the cow and the stall-cock.

Removal of the milker hose 45 from the stall-cock 40 automatically removes the sub-atmospheric pressure from beneath diaphragm 12, rod 13 is moved up by spring 38 and contacts 34 and 35 open, thereby breaking the electrical circuit to relay 18, and actuating pawl 20 and holding pawl 21 are raised out of contact with ratchet 19. This allows shafts 22 and 25 to rotate freely under the influence of spring 26, and gear wheel 24 will rotate counter-clockwise until insulated projection 28 comes in contact with projection 32 positioned by the time set knob 27. As soon as projection 28 leaves flexible contact 29, the electrical circuit for lamp 33 is broken and the lamp extinguished.

From the foregoing description, it will be understood that the device will give a signal to the operator of the milking machine at the end of a predetermined length of time as set by the time indicator knob 27, and that the starting, stopping and resetting of the device is fully automatic without any act on the part of the operator in addition to the usual milker operations.

Figure 2:
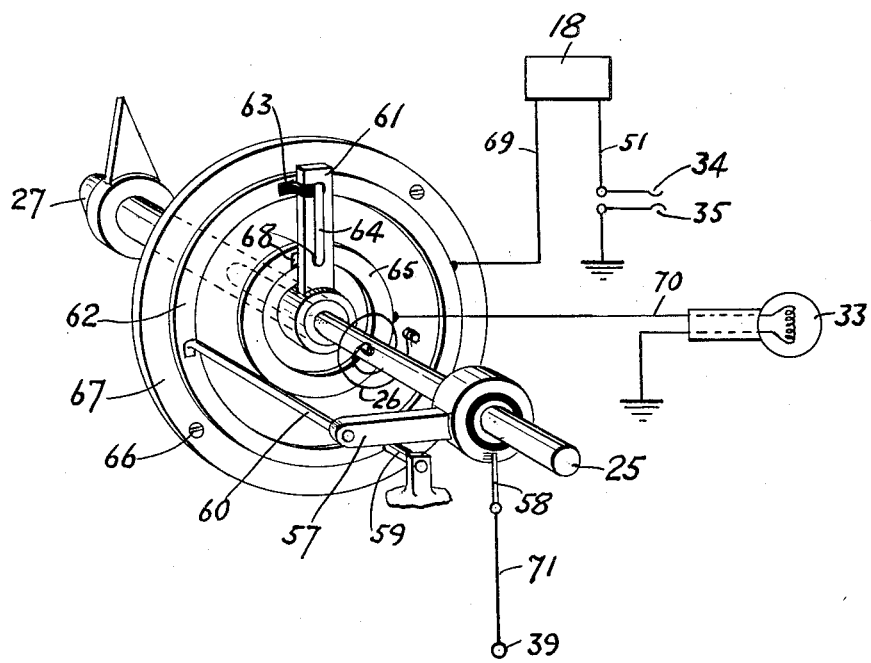
Fig. 2 is a similar view of a modification with certain elements omitted that are common to both embodiments.

In Fig. 2 a modification is shown in which, at the end of the predetermined time cycle, the stopping device is electrically operated. The construction shown in Fig. 2 differs from that shown in Fig. 1 only so far as it involves a replacement, by such construction, of elements 28, 29, 30 and 32, the main elements of the construction of Fig. 1 being retained. In this arrangement, a contact arm 57 is mounted on the shaft 25 so as to turn therewith, but is insulated therefrom. A brush contact 58 connects the arm 57 with the pulsating current terminal 39. When the timer is not in operation, arm 57 is held against a stud 59 (mounted on the mechanism case) by the counterclockwise tension of spring 26. Arm 57 carries a brush contact 60 at its outer extremity which makes contact with a stationary current conductor ring 62 arranged concentrically to shaft 25. A stationary arm 61, made of insulating material, is carried by the indicator knob 27 in line with the pointer thereof in the same manner as arm 31 in Fig. 1. To the upper end of arm 61 is secured a thin non-conductor trailing shoe 63. This shoe serves as a ramp from the ring 62 to the face of the arm 61, which carries a bare conductor strip 64. Inside of and concentric with ring 62 is a second stationary current conductor ring 65, which is electrically connected, through a contact brush 68 on arm 61, with the bare conductor strip 64. Both rings 62 and 65 are mounted on an insulated base 67, which is affixed to the casing (not shown) by screws 66. Ring 62 is electrically connected, through a conductor 69, to one side of the relay 18 and ring 65 is electrically connected, through electric circuit 70, to lamp 33.

In operation, when the milker hose 45 is applied to the stall cock 40, thereby pneumatically operating rod 13 and closing contacts 34 and 35, the operating circuit for relay 18, instead of being closed through lines 50 and 51 as in Fig. 1, is closed through line 51, line 69, ring 62, brush contact 60, arm 57, brush 58 and wire 71, to terminal 39. Operation of relay 18 will then proceed as in Fig. 1 and shaft 25 and contact arm 57 will rotate in a clockwise direction until brush 60 rides up the trailing shoe 63 and makes contact with bare conductor strip 64, which will then open the pulsating current through relay 18 and close it through lamp 33 by means of brush 68, ring 65 and conductor 70. It should be here stated that the length of travel of brush 60 from ring 62 up trailing shoe 63 until it makes contact with bare conductor strip 64 is very short and well within the arcuate travel of arm 57 due to a single pulsation of relay 18. The shoe 63 is shown enlarged in the drawing for the sake of clarity. It should also be stated that, notwithstanding the cessation of operation of the relay, the spring 28 is ineffective to reverse the movement of shaft 25, since this is prevented by the engagement of the holding pawl with the ratchet.

When the milker hose 45 is removed from the stall cock 40 (see Fig. 1), rod 13 will be urged upward under the influence of spring 38, thereby releasing holding pawl 21 and separating contacts 34 and 35 as in the operation of the device of Fig. 1. When this takes place, shaft 25 will rotate counterclockwise under the influence of spring 26, thereby electrically disconnecting brush 60 and strip 64 and extinguishing the lamp 33 and bringing contact arm 57 back to the position shown against stud 69.

Like the device shown in Fig. 1, the modification shown in Fig. 2 gives a signal at the end of the time period as set by the indicator knob and the starting, stopping and resetting of the device is fully automatic, the operator performing no acts other than those involved in the regular milking operation.

It will be observed that the new appliance, as illustrated, includes a timing means comprising the electromagnet 18, with the pulsating electric circuit for operating it, the armature 17 with its pawl 20', ratchet wheel 19, the shaft 25 and its driving connection from wheel 19, pin 28 (brush 60 in Fig. 2), switch contact 29 (contact 64 in Fig. 2), stop 32 (stop 59 in Fig. 2), and adjustment knob 27 for varying the initial relative positions of member 28 (60) and contact 29 (64) and therefore the duration of the timing cycle. Operation of the timing means is started by initiating means including the rod 13 with its abutment 14 for closing the electromagnet switch 34, 35, and the fingers 15, 16 which, when rod 13 is lowered, cause the pawl 20' to move into operative relation with the ratchet wheel 19. The initiating means are under control of the valve 48 which serves as a device for selectively connecting the milking machine (through hose 45) to, and disconnecting it from, pipe 42 and the source of subatmospheric pressure for operating the machine; that is, opening and closing of the valve 48, by attachment and detachment of hose 45, causes lowering and raising of the rod 13, as previously described. The spring 26 serves as a means for automatically resetting the timing means to its starting position, this resetting means being likewise under control of the device 48, since spring 26 cannot reset the timing means until the valve 48 is closed to cause upward movement of the rod 13.

It will be understood that the invention is not limited in its application to the type of milking machine to which I have described it as applied; nor is the invention limited to the described details of construction: the description merely illustrating preferred applications and embodiments of the invention.

What I claim and desire to protect by Letters Patent is:

1. A milking machine contrivance comprising mechanism operable step by step, an electrically operable device, included in a normally open, pulsating electric circuit, adapted to operate said mechanism, a pneumatically actuable contrivance for closing said circuit, a member turnable with said mechanism in one direction, a spring tending to turn said member in the opposite direction and holding it in a given position when said circuit is open, said circuit including a ring concentric with said member and a brush carried by said turnable member and in slidable contact with said ring while said member is moving against the action of said spring in the first named direction, a normally open special circuit and a signal device therein, and means adapted, after said member, against the tension of said spring, has turned a predetermined distance, to transfer the pulsating current to the special circuit.

2. In a timing appliance for use with milking systems of the type having a pipe connected to a source of sub-atmospheric pressure for operation of a milking machine and communicating with a source of higher pressure when the machine is stopped, the combination of a casing adapted for connection to said pipe, an actuating element in the casing operable pneumatically in response to pressure changes in said pipe, timing means, means under control of the actuating element for initiating operation of the timing means from a starting position, and means under control of the actuating element for resetting the timing means to its starting position.

3. In a milking system having a pipe line adapted to contain air at sub-atmospheric pressure, a branch pipe leading from said line and adapted for connection to a milking machine, and a valve for connecting the branch pipe to and disconnecting it from said line, the combination of a casing communicating with the branch pipe beyond the valve from said line, an actuating element in the casing operable pneumatically in response to pressure changes therein, timing means, means under control of the actuating element for initiating operation of the timing means from a starting position when the valve is opened, and means under control of the actuating element for resetting the timing means to its starting position when the valve is closed.

4. An appliance for use with a milking machine having means for connecting the milking machine to a pneumatic pipe line, which comprises mechanism operable step by step, an electrically operable device included in a normally open, pulsating electric circuit and adapted to so operate said mechanism, a contrivance actuable pneumatically from said connecting means to close said circuit and thereby effect actuation of said step by step mechanism, and means for arresting the step by step movement of said mechanism after it has completed a predetermined cycle of movement, said step by step mechanism including a ratchet wheel and a pawl movable into operative relation with the ratchet wheel by the movement of the pneumatically actuable contrivance into circuit closing position, a turnable member and driving connections thereto from the ratchet wheel, a control device adapted to position said member at the start of operation, and a stop adapted to arrest the movement of said turnable member, said electrically operable device including an electro-magnet having an armature connected with and adapted to operate said pawl.

5. An appliance for use with a milking machine having means for connecting the milking machine to a pneumatic pipe line, which comprises mechanism operable step by step, an electrically operable device included in a normally open, pulsating electric circuit and adapted to so operate said mechanism, a contrivance actuable pneumatically from said connecting means to close said circuit and thereby effect actuation of said step by step mechanism, and means for arresting the step by step movement of said mechanism after it has completed a predetermined cycle of movement, said electrically operable device including an electro-magnet having an armature which connects with and is adapted to operate a pawl, said step by step mechanism including a ratchet wheel operable by said pawl, said pneumatically actuable contrivance including a lengthwise movable rod adapted to control the movement of said pawl into and out of ratchet-engaging position when said rod is moved into circuit closing and circuit opening position.

6. An appliance for use with a milking machine having means for connecting the milking machine to a pneumatic pipe line, which comprises mechanism operable step by step, an electrically operable device included in a normally open, pulsating electric circuit and adapted to so operate said mechanism, a contrivance actuable pneumatically from said connecting means to close said circuit and thereby effect actuation of said step by step mechanism, and means for arresting the step by step movement of said mechanism after it has completed a predetermined cycle of movement, said step by step mechanism including a ratchet wheel and a pawl movable into operative relation with the ratchet wheel by the movement of the pneumatically controlled contrivance into circuit closing position, a turnable member and driving connections thereto from the ratchet wheel, means adapted to limit the movement of said turnable member, a control device adapted to position said limiting means at the start of operation, the initial positioning of said limiting means determining the extent and duration of the turning movement of said turnable member, said electrically operable device including an electro-magnet having an armature connected with and adapted to operate said pawl.

7. An appliance for use with a milking machine having means for connecting the milking machine to a pneumatic pipe line, which comprises mechanism operable step by step, an electrically operable device included in a normally open, pulsating electric circuit and adapted to so operate said mechanism, a contrivance actuable pneumatically from said connecting means to close said circuit and thereby effect actuation of said step by step mechanism, means for arresting the step by step movement of said mechanism after it has completed a predetermined cycle of movement, a normally open special circuit connectable with said pulsating circuit, a signal device in said special circuit, and means, operable when the movement of said mechanism is arrested, to close said special circuit.

8. An appliance for a milking machine operable from a vacuum pipe line connectable with a source of reduced pressure, which comprises a valve chamber adapted for pneumatic connection with the milking machine, a valve between said valve chamber and vacuum pipe, mechanism operable step by step, an electrically operable device included in a normally open, pulsating electric circuit and adapted to so operate said mechanism, a contrivance actuable pneumatically to close said circuit and thereby effect actuation of said step by step mechanism, said contrivance having a pressure face in open communication with said valve chamber, means operable to open said valve and connect said vacuum pipe line with said valve chamber and thereby subject said pressure face to reduced pneumatic pressure, and means for arresting the step by step movement of said mechanism after it has completed a predetermined cycle of movement.

GEORGE T. WILLSON.

REFERENCES CITED

The following references are of record in the file of this patent:

UNITED STATES PATENTS

| Number | Name | Date |
| --- | --- | --- |
| 1,603,049 | Hall | Oct. 12, 1926 |
| 1,892,700 | Harter | Jan. 3, 1933 |
| 2,325,312 | Follender | July 27, 1943 |
| 2,342,327 | Braun | Feb. 22, 1944 |
| 2,416,139 | Babson | Feb. 18, 1947 |